United States Patent
Roy et al.

(10) Patent No.: US 8,051,205 B2
(45) Date of Patent: Nov. 1, 2011

(54) PEER-TO-PEER DISTRIBUTED STORAGE

(75) Inventors: Subhash Chandra Roy, Lexington, MA (US); Vinay Ravuri, Santa Clara, CA (US); Parameswaran Gopi, Cupertino, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 289 days.

(21) Appl. No.: 12/250,453

(22) Filed: Oct. 13, 2008

(65) Prior Publication Data
US 2010/0094921 A1 Apr. 15, 2010

(51) Int. Cl.
G06F 15/173 (2006.01)
(52) U.S. Cl. ......... 709/244; 709/238; 709/242; 709/243
(58) Field of Classification Search .................. 709/238, 709/242, 243, 244
See application file for complete search history.

(56) References Cited

U.S. PATENT DOCUMENTS

| | | | |
|---|---|---|---|
| 5,857,203 A * | 1/1999 | Kauffman et al. ............. 1/1 |
| 7,478,120 B1 * | 1/2009 | Zhang .................. 709/201 |
| 7,529,785 B1 * | 5/2009 | Spertus et al. ................ 1/1 |
| 7,529,834 B1 * | 5/2009 | Birrell et al. ............. 709/226 |
| 7,549,037 B1 * | 6/2009 | Kale et al. ............. 711/218 |
| 7,596,570 B1 * | 9/2009 | Emigh et al. ................ 1/1 |
| 2003/0204613 A1 * | 10/2003 | Hudson et al. ........... 709/231 |
| 2005/0055521 A1 * | 3/2005 | Saika ..................... 711/162 |
| 2006/0075082 A1 * | 4/2006 | Haga et al. ............. 709/223 |
| 2006/0089936 A1 * | 4/2006 | Chalker .................. 707/10 |
| 2006/0136903 A1 * | 6/2006 | Childress et al. ........... 717/172 |
| 2006/0271601 A1 * | 11/2006 | Fatula et al. .............. 707/201 |
| 2006/0282678 A1 * | 12/2006 | Ali et al. ............. 713/185 |
| 2007/0208748 A1 * | 9/2007 | Li .................... 707/10 |
| 2008/0005334 A1 * | 1/2008 | Utard et al. ............ 709/226 |
| 2008/0201428 A1 * | 8/2008 | Dubnicki et al. ......... 709/205 |
| 2008/0256549 A1 * | 10/2008 | Liu et al. ............. 718/106 |
| 2008/0270524 A1 * | 10/2008 | Gupta et al. ............ 709/203 |
| 2008/0307107 A1 * | 12/2008 | Chen et al. ............ 709/231 |
| 2009/0210549 A1 * | 8/2009 | Hudson et al. ........... 709/231 |
| 2009/0265737 A1 * | 10/2009 | Issa et al. ............. 725/38 |
| 2009/0282048 A1 * | 11/2009 | Ransom et al. ........... 707/10 |
| 2009/0327505 A1 * | 12/2009 | Rao et al. ............. 709/230 |
| 2010/0058405 A1 * | 3/2010 | Ramakrishnan et al. ....... 725/97 |
| 2010/0115078 A1 * | 5/2010 | Ishikawa et al. ......... 709/223 |
| 2010/0146094 A1 * | 6/2010 | Elkayam et al. ......... 709/223 |

OTHER PUBLICATIONS

Kubiatowicz et al, OceanStore: An Architecture for Global-Scale Persistent Storage, pp. 190-201, ACM, 2000.*

* cited by examiner

*Primary Examiner* — Hieu Hoang
(74) *Attorney, Agent, or Firm* — Law Office of Gerald Maliszewski; Gerald Maliszewski (57) ABSTRACT

A system and method are provided for peer-to-peer distributed file storage in a network of connected clients. The method transmits data file peer-storage information from a first peer node to a network-connected backup manager. The backup manager creates a mapping plan, for mapping data file segments to a peer group, which typically includes a plurality of network-connected peer nodes. The backup manager transmits the mapping plan to the first peer node. The first peer node distributes the data file segments to the peer group in accordance with the mapping plan, for storage in tangible memory media. Typically, the first peer node accepts a data file and encrypts the data file. In one aspect, the backup manager creates a mapping plan for distributing (n+x) erasure-coded segments. After receipt of the mapping plan, the first peer node creates the (n+x) erasure coded file segments in preparation for distribution.

19 Claims, 8 Drawing Sheets

PEER-TO-PEER DISTRIBUTED STORAGE

BACKGROUND OF THE INVENTION

1. Field of the Invention

This invention generally relates to information storage and, more particularly, to a system and method for peer-to-peer distributed information storage.

2. Description of the Related Art

A peer-to-peer (P2P) computer network uses the diverse connectivity and cumulative bandwidth of network participants, rather than the centralized resources of a relatively low number of servers. Sharing files containing audio, video, data or anything in digital format is very common, and realtime data, such as telephony traffic, is also passed using P2P technology.

A pure P2P network does not have the notion of clients or servers, but only equal peer nodes that simultaneously function as both "clients" and "servers" to the other nodes on the network. This model of network arrangement differs from the client-server model where communication is usually to and from a central server. A typical example of a file transfer that is not P2P, is an FTP server where the client and server programs are quite distinct. The clients initiate the download/uploads, and the servers react to and satisfy these requests.

In "pure" P2P networks the peers act as equals, merging the roles of clients and server. There is no central server managing the network or central router. A hybrid P2P system may have a central server that keeps information on peers and responds to requests for that information. The peers are responsible for hosting available resources (as the central server does not have them), for letting the central server know what resources they want to share, and for making its shareable resources available to peers that request it. Route terminals can be used as addresses, which are referenced by a set of indices to obtain an absolute address. Napster was an example of a centralized P2P network, while KaZaA was more decentralized.

The advantage of a P2P networks is that all clients provide resources, including bandwidth, storage space, and computing power. Thus, as nodes arrive and demand on the system increases, the total capacity of the system also increases. This is not true of a client-server architecture with a fixed set of servers, in which adding more clients could mean slower data transfer for all users. The distributed nature of P2P networks also increases robustness in case of failures by replicating data over multiple peers, and in pure P2P systems, by enabling peers to find the data without relying on a centralized index server. In the latter case, there is no single point of failure in the system.

The P2P overlay network consists of all the participating peers as network nodes. There are links between any two nodes that know each other: i.e. if a participating peer knows the location of another peer in the P2P network, then there is a directed edge from the former node to the latter in the overlay network. Based on how the nodes in the overlay network are linked to each other, P2P networks may be classified as unstructured or structured.

An unstructured P2P network is formed when the overlay links are established arbitrarily. Such networks can be easily constructed as a new peer that wants to join the network can copy existing links of another node and then form its own links over time. Structured P2P network employ a globally consistent protocol to ensure that any node can efficiently route a search to some peer that has the desired file. Such a guarantee necessitates a more structured pattern of overlay links. By far the most common type of structured P2P network is the distributed hash table (DHT), in which a variant of consistent hashing is used to assign ownership of each file to a particular peer, in a way analogous to a traditional hash table's assignment of each key to a particular array slot. Some well known DHTs are Chord, Pastry, Tapestry, CAN, and Tulip.

Using the Chord lookup protocol, node keys are arranged in a circle. The circle cannot have more than $2^m$ nodes. The ring can have ids/keys ranging from 0 to $2^m-1$. IDs and keys are assigned an m-bit identifier using what is known as consistent hashing. The SHA-1 algorithm is the base hashing function for consistent hashing. The consistent bashing is integral to the probability of the robustness and performance because both keys and IDs (IP addresses) are uniformly distributed and in the same identifier space. Consistent hashing is also necessary to let nodes join and leave the network without disrupting the network.

Each node has a successor and a predecessor. The successor to a node or key is the next clockwise node in the identifier circle. The predecessor of a node or key is the next counter-clockwise node in the id circle. If there is a node for each possible ID, the successor of node 2 is node 3, and the predecessor of node 1 is node 0. However, normally there are holes in the sequence, so, for example, the successor of node 153 may be node 167 (and nodes from 154 to 166 will not exist). In this case, the predecessor of node 167 will be node 153. Since the successor (or predecessor) node may disappear from the network (because of failure or departure), each node records a whole segment of the circle adjacent to it, i.e. the K nodes preceding it and the K nodes following it. One successor and predecessor are kept in a list to maintain a high probability that the successor and predecessor pointers actually point to the correct nodes after possible failure or departure of the initial successor or predecessor.

BitTorrent is a peer-to-peer file sharing protocol used to distribute large amounts of data. The initial distributor of the complete file or collection acts as the first seed. Each peer who downloads the data also upload's them to other peers. Relative to standard Internet hosting, this method provides a significant reduction in the original distributor's hardware and bandwidth resource costs. It also provides redundancy against system problems and reduces dependence on the original distributor.

To share a file or group of files, a peer first creates a small file called a "torrent" (e.g. MyFile.torrent). This file contains metadata about the files to be shared and about the tracker, the computer that coordinates the file distribution. Peers that want to download the file first obtain a torrent file for it, and connect to the specified tracker, which tells them from which other peers to download the pieces of the file. Though both ultimately transfer files over a network, a BitTorrent download differs from a classic full-file HTTP request in several fundamental ways.

The peer distributing a data file treats the file as a number of identically-sized pieces, typically between 64 kB and 4 MB each. The peer creates a checksum for each piece, using the SHA1 hashing algorithm, and records it in the torrent file. Pieces with sizes greater than 512 kB will reduce the size of a torrent file for a very large payload, but is claimed to reduce the efficiency of the protocol. When another peer later receives a particular piece, the checksum of the piece is compared to the recorded checksum to test that the piece is error-free. Peers that provide a complete file are called seeders, and the peer providing the initial copy is called the initial seeder.

Users browse the web to find a torrent of interest, download it, and open it with a BitTorrent client. The client connects to the tracker(s) specified in the torrent file, from which it receives a list of peers currently transferring pieces of the file(s) specified in the torrent. The client connects to those peers to obtain the various pieces. Such a group of peers connected to each other to share a torrent is called a swarm. If the swarm contains only the initial seeder, the client connects directly to it and begins to request pieces. As peers enter the swarm, they begin to trade pieces with one another, instead of downloading directly from the seeder. BitTorrent does not offer its users anonymity. It is possible to obtain the IP addresses of all current, and possibly previous, participants in a swarm from the tracker. This may expose users with insecure systems to attacks.

All of the above-mentioned systems are generally concerned with the retrieval and sharing of complete files, rather than the distribution of segments from a single file across many peers. Conventional information storage backup systems, such as Network Attached Storage (NAS) use a software client (e.g., a PC) that moves information to a RAID-based network storage system. The backup storage location is a large data center which contains enough storage to store information for all the connected users. The data center may be connected via the Internet, for example.

Figure 1A:
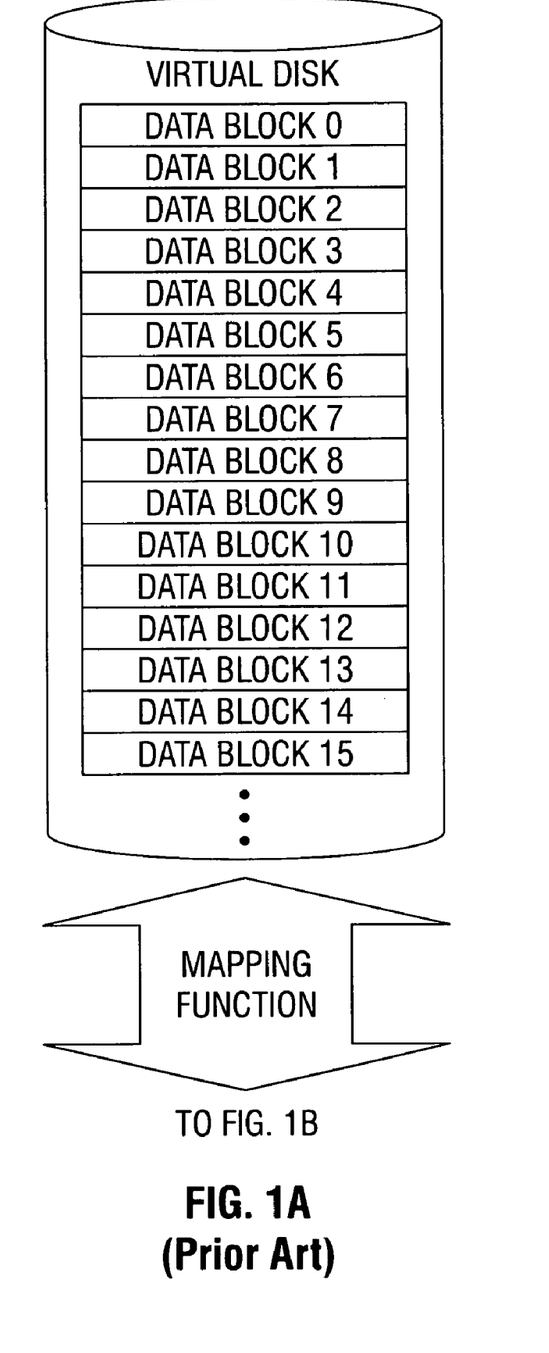
FIGS. 1A and 1B are diagrams depicting a RAID 5 system (prior art).
Figure 1B:
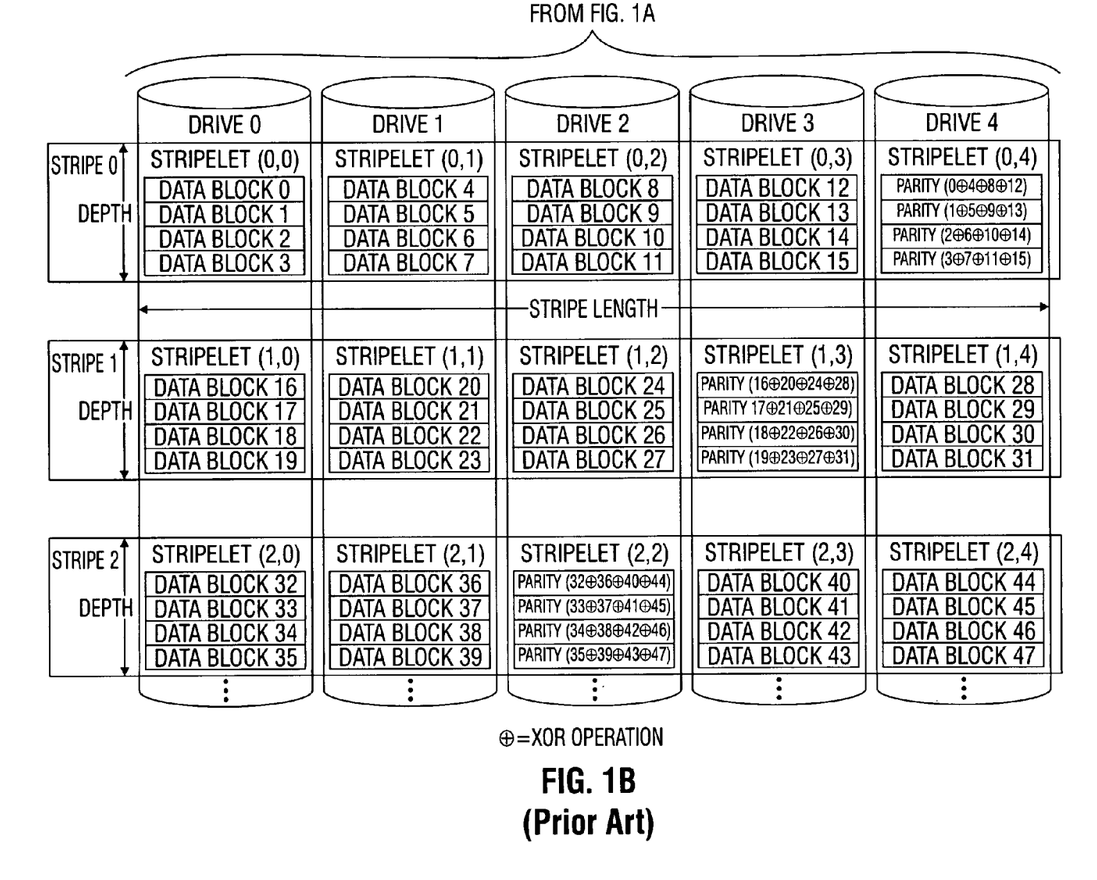

FIGS. 1A and 1B are diagrams depicting a RAID 5 system (prior art). RAID 5 and RAID 6 are well known as systems for the redundant array of independent disks. RAID systems are an example of what is referred to herein as an erasure code. Instead of distributing data "vertically" (from lowest sector to highest) on single disks, RAID 5 distributes data in two dimensions. First, "horizontally" in a row across n number of disks, then "vertically" as rows are repeated. A row consists of equal "chunks" of data on each disk and is referred to as a "stripe". Each chunk of data, or each disk's portion of the stripe, is referred to as a stripelet.

For RAID 5, one of the stripelets is designated as a parity stripelet. This stripelet consists of the XOR of all the other stripelets in the stripe. The operation for XOR'ing the data for a parity stripelet is referred to as P-calculation. The purpose of the parity is to provide for a level of redundancy. Since the RAID is now depicting a virtual disk consisting of multiple physical disks, there is a higher probability of one the individual physical disks failing. If one of the stripelets cannot be read due to an individual disk error or failure, the data for that stripelet can be reassembled by XOR'ing all the other stripelets in the stripe.

It would be advantageous if a P2P system existed that permitted a user to distribute information among a group of peers in a manner that ensured the confidentiality of the information and protected against peer failures.

SUMMARY OF THE INVENTION

Described herein is a means for eliminating the need for massive disk storage in a centralized data center. Rather, information storage is spread out on the edge of a network. The use of software agents, peer-to-peer networking technology, and the aggregate cheap storage at the edge emulates the capacity and management of the centralized data center. Another advantage is that information can be striped across the local storage media attached to each customer premises equipment (CPE) peer.

Accordingly, a method is provided for peer-to-peer distributed file storage in a network of connected clients. The method transmits data file peer-storage information from a first peer node to a network-connected backup manager. The backup manager creates a mapping plan, for mapping data file segments to a peer group, which typically includes a plurality of network-connected peer nodes. The backup manager transmits the mapping plan to the first peer node. The first peer node distributes the data file segments to the peer group in accordance with the mapping plan, for storage in tangible memory media.

Typically, the first peer node accepts a data file and encrypts the data file. In one aspect, the first peer node sends data file peer-storage information for a data file of n segments, and the backup manager creates a mapping plan for distributing (n+x) erasure-coded segments. After receipt of the mapping plan, the first peer node creates the (n+x) erasure coded file segments in preparation for distribution. In another aspect, the first peer node includes a file distribution manager for generating a distributed hash table (DHT) that cross-references coded segments to the peer nodes storing the coded segments. In one other aspect, the first peer node receives a requested node write-access key from the backup manager and sends the node write-access key with the data file segments, to gain storage access to a node in the peer group, as part of the distribution process. In one variation, a different write-access key may be used for each storage node.

Retrieval of the storage file is essentially the reverse of the storage process. After the first peer node receives instructions to recover the stored data file, the first peer node sends download requests for data file segments to the peer group. Then, the first peer node reassembles the data file from the downloaded data file segments.

Additional details of the above-described method and a system for peer-to-peer distributed file storage in a network of connected clients are provided below.

DETAILED DESCRIPTION

Figure 2:
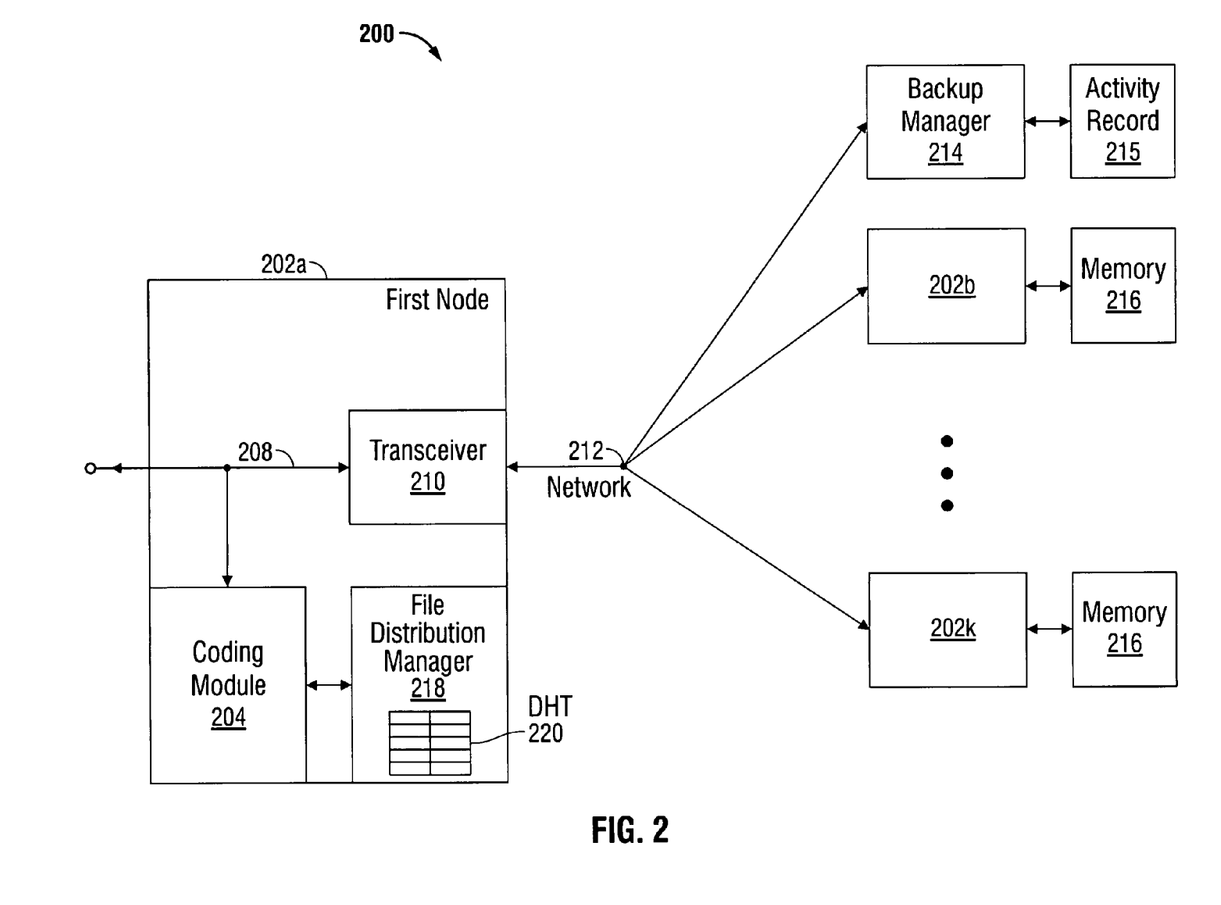
FIG. 2 is a schematic block diagram of a system for peer-to-peer distributed file storage in a network of connected clients.

FIG. 2 is a schematic block diagram of a system for peer-to-peer distributed file storage in a network of connected clients. The system 200 comprises a group of network-connected peer devices or nodes 202. As shown, the peer group includes first node 202a, second node 202b, and kth node 202k. Although k is equal to three in this example, the system is not limited to any particular number of peer devices. The first node 202a, which is representative of the other peer devices in the system, has a coding module 204 with an interface on line 208 to receive a data file from a user for storage and to supply data file peer-storage information. In one aspect, the coding module is connected to a personal computer or peripheral (not shown) via an Ethernet interface on line 208. Alternately, the coding module 204 may be connected to a peripheral or computer via an ad hoc network on line 212, such as Bluetooth or IEEE 802.11. In its simplest form, the data file peer-storage information may be the size of the file and the identity of the source node. The first node 202a also includes a transceiver 210 with an interface connected to the coding module and a network interface on line 212. The transceiver 210 transmits the data file peer-storage information to a backup manager 214.

A network-connected backup manager 214 has an interface on line 212 to receive the data file peer-storage information and to send a mapping plan to the first node 202a. In one aspect, the backup manager 214 maintains a record 215 of the first node file storage activity based upon storage, usage, bandwidth, or some other metric. Such a metric would permit billing of the first node for services and control over the first node's access to services.

The mapping plan sent by the backup manager 214 is for mapping data file segments to the peer group. The first node coding module 204 segments the data file and uses the mapping plan for cross-referencing data file segments to peer devices in a peer group. Then, the first node transceiver 210 transmits mapped data file segments to network-connected peers 202b and 202k for storage in tangible memory media 216.

For example, the first node coding module 204 transmits data file peer-storage information for a data file of n segments, and the backup manager 214 creates a mapping plan for distributing the (n+x) erasure coded segments. After receiving the mapping plan, the first node 202a creates (n+x) erasure coded file segments for distribution.

An erasure code transforms a message of n blocks into a message with more than n blocks, such that the original message can be recovered from a subset of those blocks. The fraction of the blocks required is called the rate, denoted r. Erasure codes are used in some forms of forward error correction.

In another aspect, the first node coding module 204 encrypts the data file prior to distributing data file segments to the peer group. If the file is erasure-coded, the encryption is performed prior to erasure coding.

In another aspect, the first node includes a file distribution manager 218 for generating a distributed hash table (DHT) 220 cross-referencing coded segments to the peer nodes storing the coded segments. In one aspect of the system not shown, the DHT is distributed among the peer devices in the peer group. In another aspect not shown, the backup manager keeps a copy of the DHT. In another variation, the backup manager stores the DHT, and the first node requests a copy of the DHT when it is time to recover the file from storage.

In another variation, the backup manager 214 sends a requested node write-access key to the first node transceiver. The first node 202a prepares data file segments for distribution using the node write-access key to gain storage access to a node (e.g., 202b) in the peer group. In one aspect, the same write-access key is used for all the nodes in the system. In another aspect, a separate key is used for each node. The backup manager 214 may transmit the key(s) with the mapping plan, or after a subsequent request from the first node 202a for keys.

The recovery of a stored data file is essentially the reverse of the process used to store a file. Generally, the first node coding module 204 prepares download requests for data file segments to the peer group 202b and 202k, in response to receiving instructions to recover the stored data file on line 208, i.e. from a peripheral or computer (not shown). The first node coding module reassembles the data file from the downloaded data file segments. The first node coding module prepares download requests to the first peer group by reading a stored DHT, and accessing a list of file segments cross-referenced to the peer nodes storing the file segments.

If the file was erasure coded before storage, the first node transceiver 210 sends download requests for (n+x) erasure-coded segments, and the first node coding module 204 uses an erasure code to recover n data file segments from the (n+x) coded segments. If the file was encrypted before storage, the first node coding module 204 decrypts the data file subsequent to reassembling the encrypted data file. If the file has been encrypted and erasure coded, the file is decrypted subsequent to applying the erasure code to the reassembled file.

In one aspect, the first node transceiver 210 receives a requested node read-access key from the backup manager 214, and the first node coding module 204 prepares download requests using the node read-access key to gain read access to a node in the peer group.

Functional Description

Figure 3:
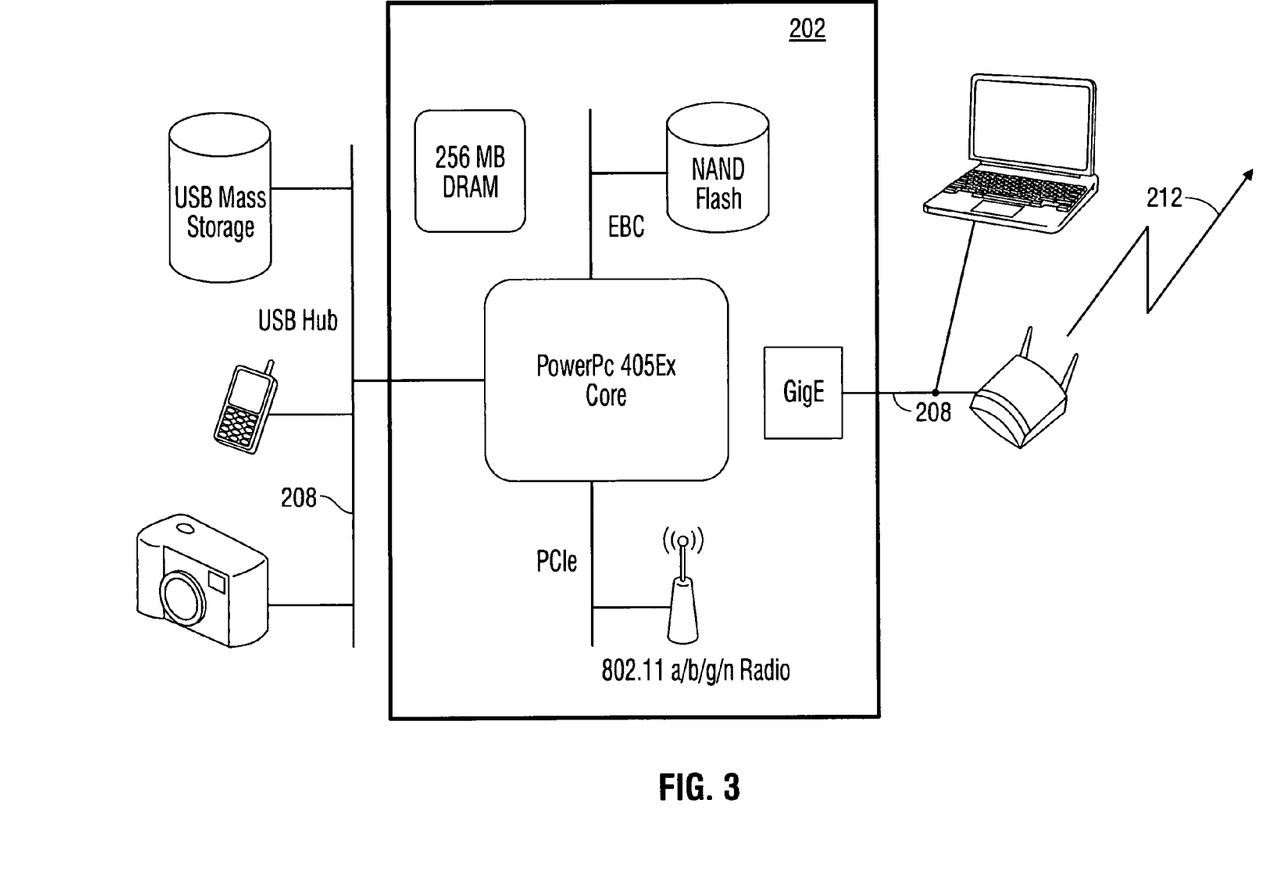
FIG. 3 is a schematic block diagram of an exemplary peer node.

FIG. 3 is a schematic block diagram of an exemplary peer node. The peer node depicts a CPE 202 with the local disk (USB Mass Storage) 216 attached via a USB interface 208. Typically, each node has a Node ID, and a secure mechanism to share its Node ID with others in the peer group. For security, the Node ID can be a SHA-256* hash of its public key. The peer group federation id is a shared id amongst node id's within the group, and Shamir's Secret Sharing algorithm may be used. Shamir's Secret Sharing is a form of secret sharing, where a secret is divided into parts, giving each participant its own unique part, where some of the parts or all of them are needed in order to reconstruct the secret. To decode the id, a subset of node IDs within the group are required. Data may be encrypted using AES-256 w/CBC*, and a key generated using SHA-256*.

The actual data to be stored may be divided into 2 sections, metadata and storage sections. The metadata section contains file information (e.g., file name, permission). The storage section contains the actual file data. Subscriber credits may be stored on the backup manager. Individual credits may be stored in local persistent cache (flash).

When backup of information is requested, a peer node (i.e. embedded in a laptop/computer) communicates with the backup software agent ("CPE Agent") running on the CPE, which has been referred to herein as a coding module. When a media device (i.e. a digital media device such as a cell phone, DSC, or camcorder) is connected to the CPE, the CPE Agent running on the CPE detects the media device. The CPE Agent then communicates to the network-based backup manager. The backup manager looks at the network topology in which the CPE is a part, and decides which end points in the network will be used for storage. The CPE Agent then creates a backup database. The backup database may be temporarily created either on the CPE or the computer. The backup database is encrypted (e.g., SHA and AES algorithms), encoded using erasure codes, and then transmitted striped across multiple storage end points using the procedures described below.

Figure 4:
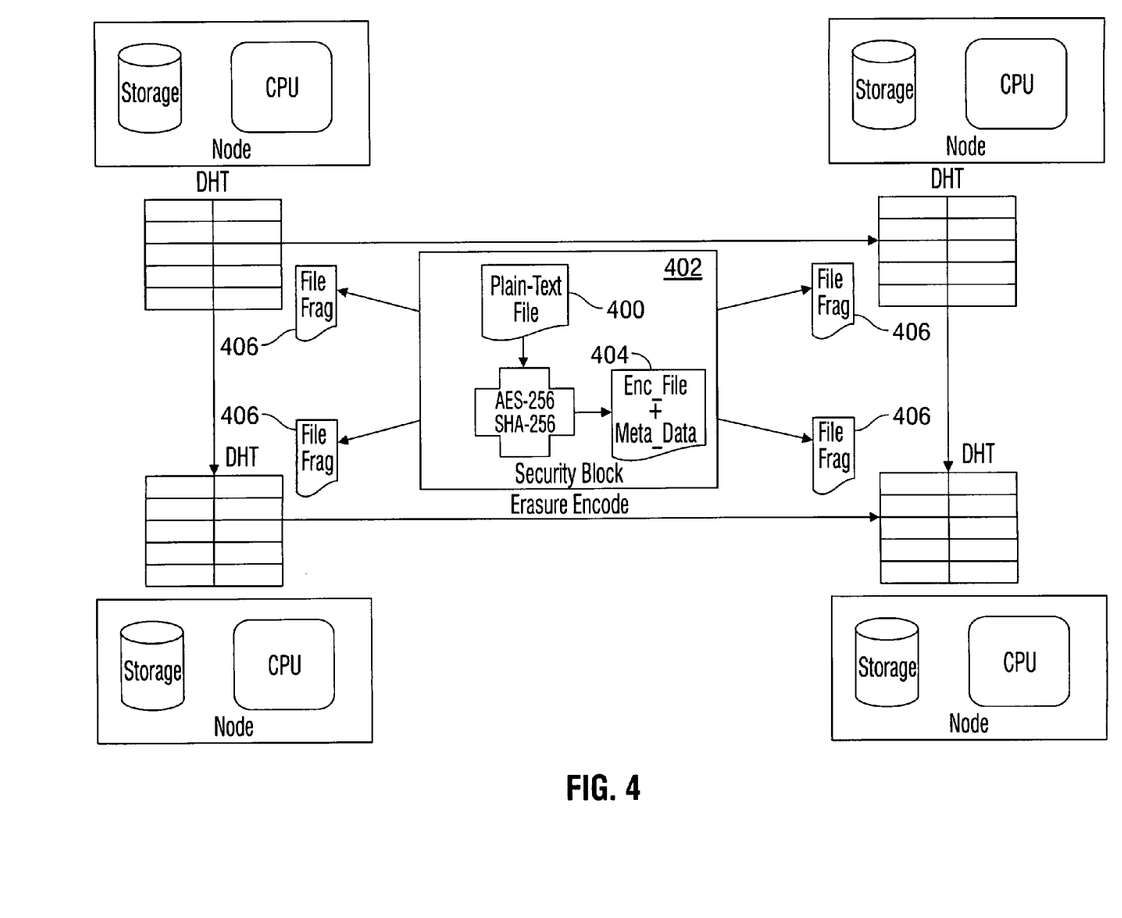
FIG. 4 is a diagram depicting an exemplary flow of data for storage in a peer group.

FIG. 4 is a diagram depicting an exemplary flow of data for storage in a peer group. The original file 400 is the starting point for the process, which first goes into the security block 402. The resultant information 404 is the encrypted metadata and file information. This resultant information is processed using an erasure encoding algorithms and divided into segments or file fragments 406.

Figure 5:
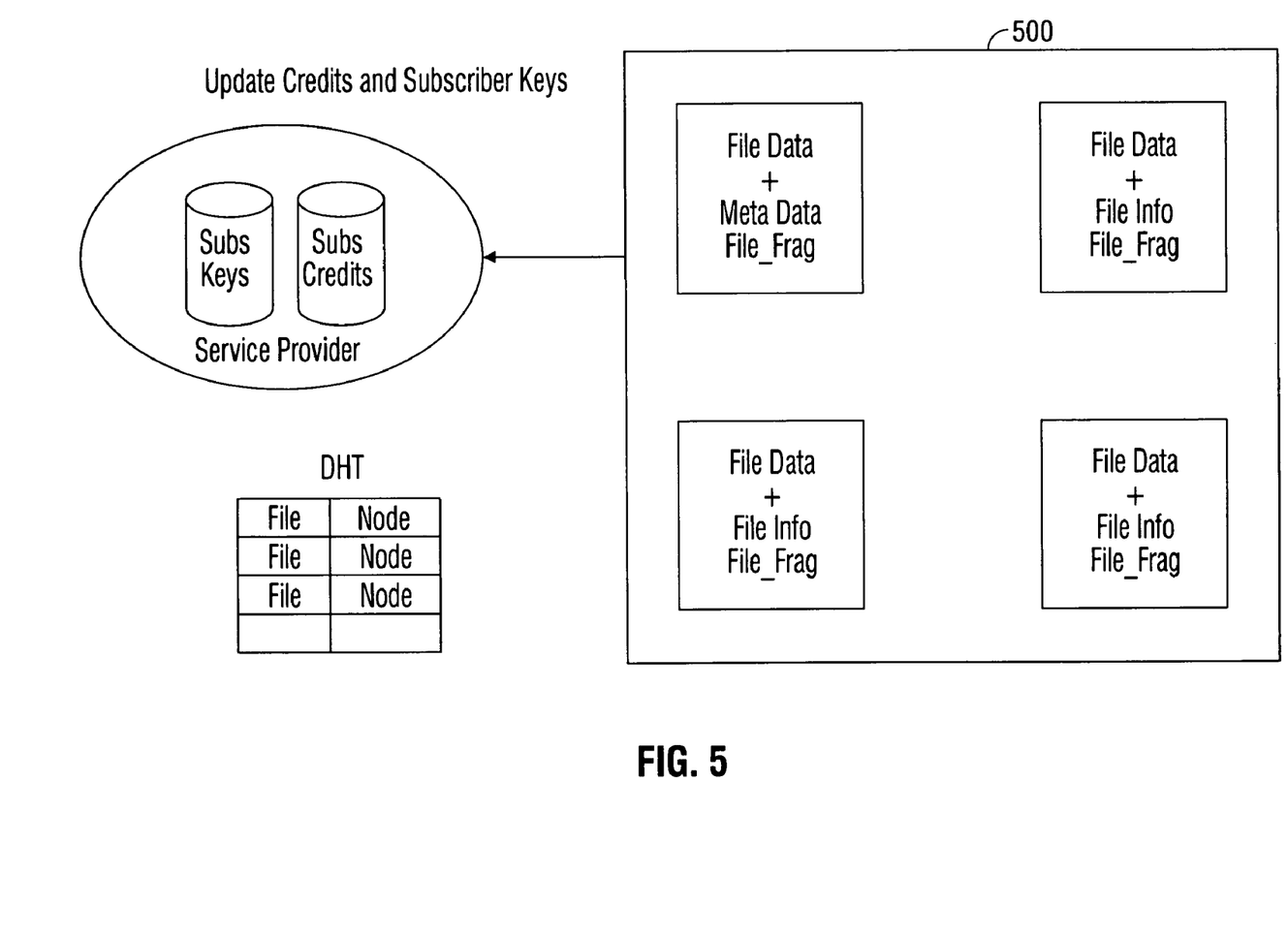
FIG. 5 is a diagram continuing the data flow process description begun in FIG. 4.

FIG. 5 is a diagram continuing the data flow process description begun in FIG. 4. After processing both the encoded file and metadata with the erasure code, the resultant is combined together into one single file—the final monolithic backup file 500. This monolithic file is then segmented and distributed across multiple nodes by the backup manager using a file distribution algorithm. The file distribution manager, embedded with the file originating peer node, manages a database which includes the mapping of where the file segments are transferred. In one aspect, a variant of the Chord method generates a Distributed Hash Table (DHT).

Figure 6:
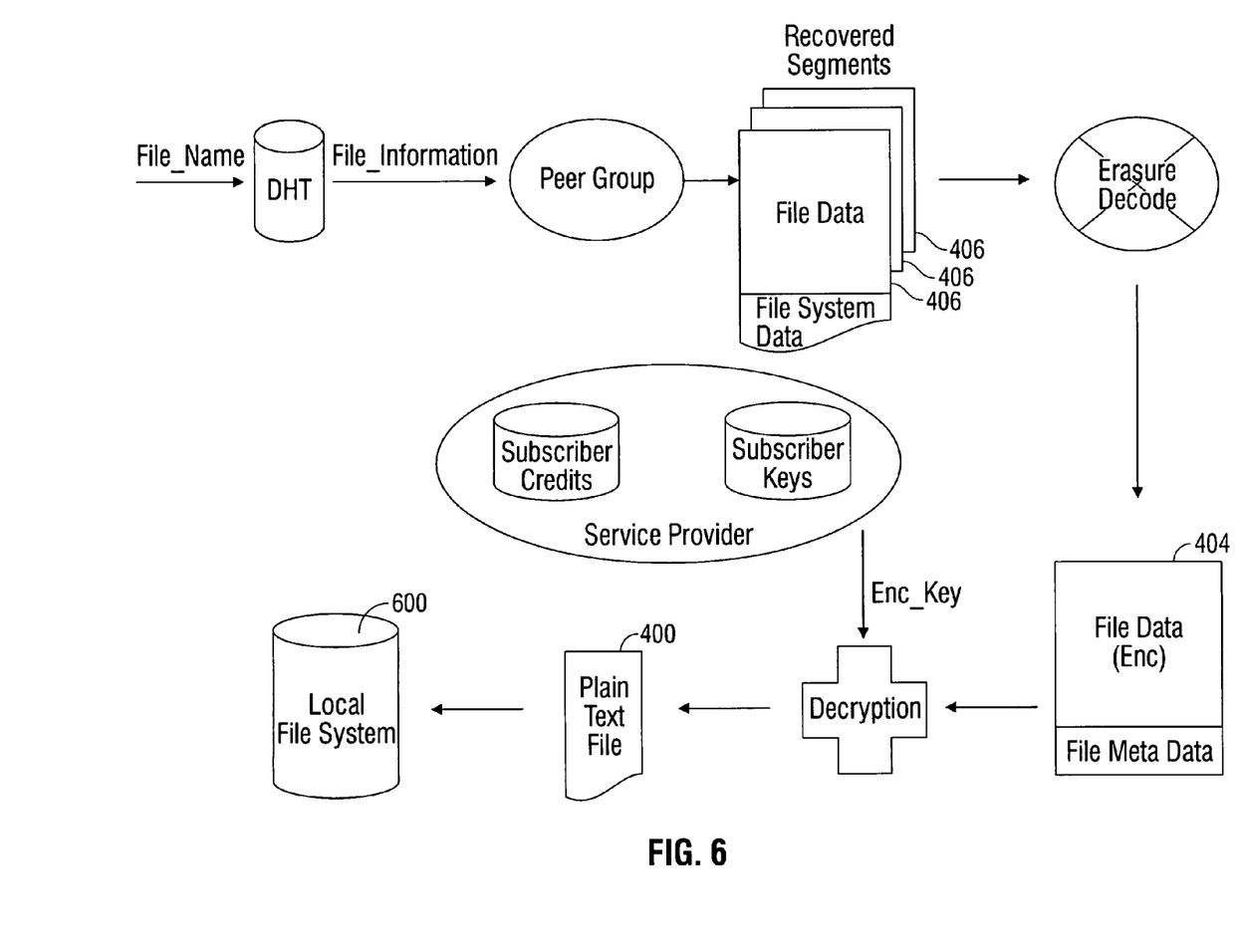
FIG. 6 is a diagram depicting the data flow associated with backup restoration.

FIG. 6 is a diagram depicting the data flow associated with backup restoration. The original file name is passed to the originating node. The originating node accesses the DHT, which provides the locations of all the file segments 406. The segments are then re-assembled at the originating node. The erasure decode algorithm is then run to create the encoded encrypted file 404. The file is then decrypted using the same key as was generated during the encoding process, to recreate the original file 400. The original file is then moved to the local file system 600 for access.

The overall architecture removes the need for an extremely large central database to store all the backup information, saving cost in capital equipment and operations such as managing a data center and energy for powering/cooling the data center. The P2P distribution system enables the rapid rollout of backup services without the need for building out or leasing data center space.

The P2P distributed file storage system can be contrasted with the P2P techniques used by BitTorrent and Napster, where a central server mechanism is used to manage the information location and the overall capacity of the system, but which do not store the backup information locally.

Figure 7:
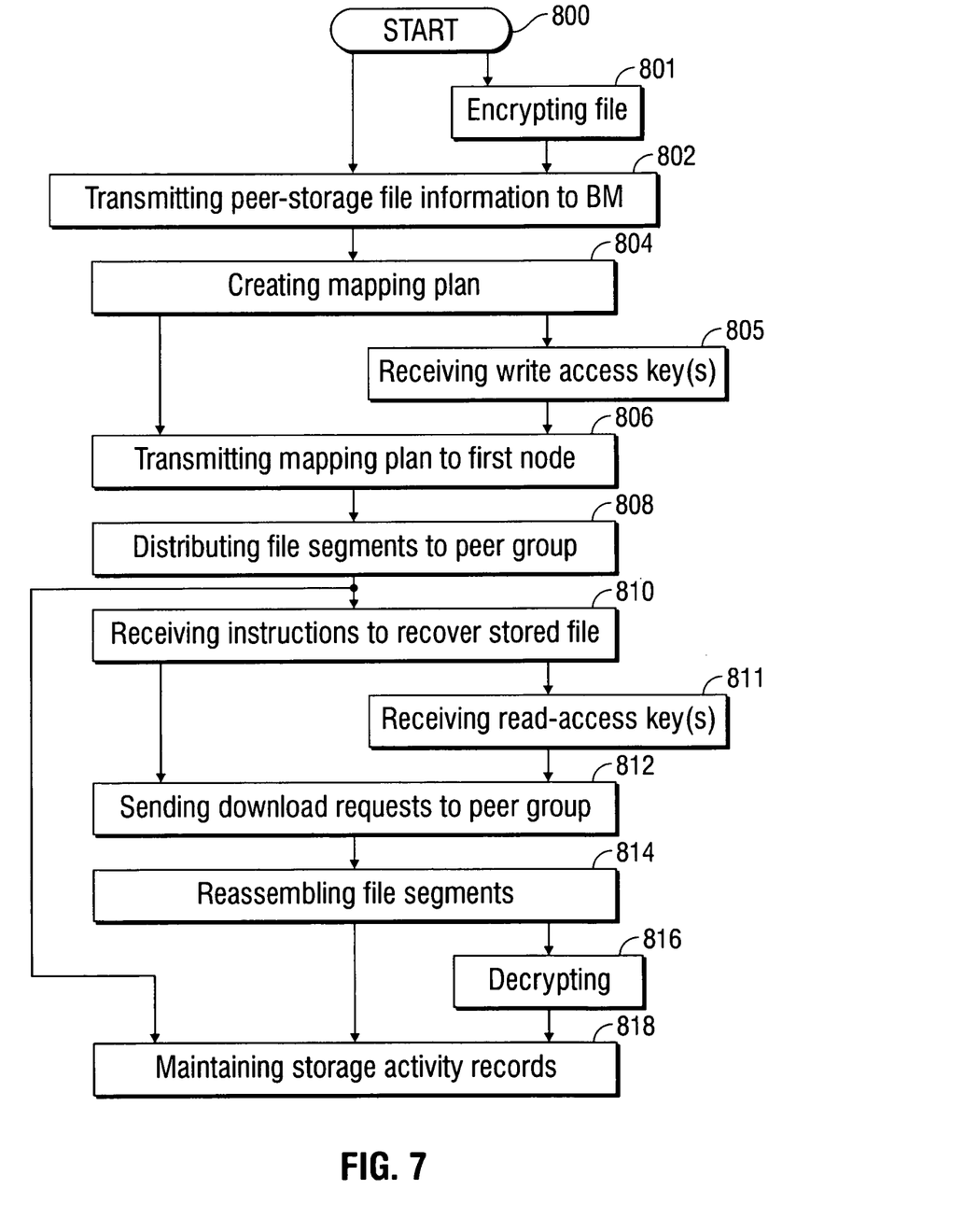
FIG. 7 is a flowchart illustrating a method for peer-to-peer distributed file storage in a network of connected clients.

FIG. 7 is a flowchart illustrating a method for peer-to-peer distributed file storage in a network of connected clients. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 transmits data file peer-storage information from a first peer node to a network-connected backup manager (BM). In Step 804 the backup manager creates a mapping plan, for mapping data file segments to a peer group including a plurality of network-connected peer nodes. In Step 806 the backup manager transmits the mapping plan to the first peer node. In Step 808 the first peer node distributes the data file segments to the peer group in accordance with the mapping plan, for storage in tangible memory media. For example, distributing the data file segments to the peer group in Step 808 may include a first peer node file distribution manager generating a distributed hash table (DHT) cross-referencing file segments to the peer nodes storing the file segments.

In one aspect, transmitting data file peer-storage information in Step 802 includes transmitting information for a file including n segments. Creating the mapping plan in Step 804 includes the backup manager creating a mapping plan for distributing (n+x) erasure-coded segments. Then, distributing the data file segments in Step 808 includes the first node creating (n+x) erasure coded file segments prior to distributing file segments.

In another aspect, the first peer node encrypts the data file (Step 801). Then, distributing the data file segments to the peer group in Step 808 includes the first node distributing segments of the encrypted data file.

In another aspect (Step 805), prior the first peer node distributing data file segments, the first peer node receives a requested node write-access key from the backup manager. Then, distributing the data file segments in Step 808 includes sending the node write-access key with the data file segments, to gain storage access to a node in the peer group. Note: Step 805 may occur after Step 806 or simultaneous with Step 806.

In Step 810 the first peer node receives instructions to recover the stored data file. In Step 812 the first peer node sends download requests for data file segments to the peer group. For example, Step 812 may include the substeps of: the first peer node reading a stored DHT; and, accessing a list of file segments cross-referenced to the peer nodes storing the file segments. In Step 814 the first peer node reassembles the data file from the downloaded data file segments.

In one aspect, sending download requests for the data file segments in Step 812 includes sending requests for (n+x) erasure-coded segments. Then, reassembling the data file from the downloaded data file segments in Step 814 includes the first peer node using an erasure code to recover n data file segments from the (n+x) coded segments.

In one aspect (Step 811), prior to sending download requests to the peer group, the first node receives a requested node read-access key from the backup manager. Then, sending download requests for data file segments in Step 812 includes sending the node read-access key with the download requests, to gain read access to a node in the peer group.

In a different aspect, reassembling the data file from the downloaded data file segments in Step 814 includes reassembling an encrypted data file. Then, Step 816 decrypts the encrypted data file. Optionally, in Step 818, the backup manager maintains a record of the first node file storage activity.

A system and method for P2P distributed file storage has been presented. Specific devices and data flows have been provided to illustrate the invention, but the invention is not necessarily limited to these examples. Other variations and embodiments will occur to those skilled in the art.

We claim:

1. In a peer-to-peer network, a method for peer-to-peer distributed file storage, the method comprising:
    transmitting data file peer-storage information for a data file including a plurality of n segments for storage from a first peer node to a network-connected backup manager, the data file peer-storage information including a size of the data file and an identification of the first peer node;
    based on the data file peer-storage information, the network-connected backup manager creating a mapping plan that maps (n+x) erasure-coded segments including the plurality of n segments and x extra erasure-coded segments across a plurality of peer nodes forming a peer group, wherein the mapping plan cross-references each segment of the (n+x) erasure-coded segments to a corresponding peer node from the plurality of peer nodes;
    the network-connected backup manager transmitting the mapping plan to the first peer node; and
    the first peer node distributing the (n+x) erasure-coded segments to the plurality of peer nodes in the peer group in accordance with the mapping plan, wherein the (n+x) erasure-coded segments are stored in tangible memory media at the plurality of peer nodes.

2. The method of claim 1 wherein the first peer node distributing the (n+x) erasure-coded segments includes a file distribution manager at the first peer node generating a distributed hash table (DHT) cross-referencing the (n+x) erasure-coded segments to the plurality of peer nodes storing the (n+x) erasure-coded segments.

3. The method of claim 1 further comprising:
    the first peer node encrypting the data file prior to the first peer node distributing the (n+x) erasure-coded segments.

4. The method of claim 1 further comprising:
prior to the first peer node distributing the (n+x) erasure-coded segments, the first peer node receiving a node write-access key from the network-connected backup manager; and
wherein the first peer node distributing the (n+x) erasure-coded segments includes sending the node write-access key with the (n+x) erasure-coded segments, to gain storage access to a node associated with the node write-access key in the peer group.

5. The method of claim 1 further comprising:
the first peer node receiving instructions to recover the data file;
the first peer node sending download requests for downloading the (n+x) erasure-coded segments to the peer group; and
the first peer node reassembling the data file from the downloaded (n+x) erasure-coded segments.

6. The method of claim 5 wherein the first peer node sending download requests includes:
the first peer node reading a stored DHT; and
accessing a list of the (n+x) erasure-coded segments cross-referenced to the peer nodes storing the (n+x) erasure-coded segments.

7. The method of claim 5 further comprising:
prior to the first peer node sending download requests, the first peer node receiving a node read-access key from the network-connected backup manager; and
wherein the first peer node sending download requests includes sending the node read-access key with the download requests, to gain read access to a node associated with the node read-access key in the peer group.

8. The method of claim 5 wherein the first peer node reassembling the data file includes reassembling an encrypted data file; and
the method further comprising:
decrypting the encrypted data file.

9. The method of claim 1 further comprising:
the network-connected backup manager maintaining a record of file storage activity of the first peer node.

10. In a peer-to-peer network, a system for peer-to-peer distributed file storage, the system comprising:
a first peer node having a coding module with a first interface to receive a data file including a plurality of n segments for storage and a second interface to supply data file peer-storage information for the data file including a size of the data file and an identification of the first peer node, and a transceiver with a third interface connected to the coding module, the transceiver transmitting the data file peer-storage information to a network-connected backup manager;
the network-connected backup manager having a fourth interface to receive the data file peer-storage information and to send a mapping plan created by the network-connected backup manager based on the data file peer-storage information to the first peer node, the mapping plan maps (n+x) erasure-coded segments including the plurality of n segments and x extra erasure-coded segments across a plurality of peer nodes forming a peer group, wherein the mapping plan cross-references each segment of the (n+x) erasure-coded segments to a corresponding peer node from the plurality of peer nodes;
wherein the first peer node coding module creates the (n+x) erasure-coded segments and uses the mapping plan for cross-referencing the (n+x) erasure-coded segments to the plurality of peer nodes in the peer group; and
wherein the first peer node transceiver transmits the (n+x) erasure-coded segments to the plurality of peer nodes in the peer group in accordance with the mapping plan, wherein the (n+x) erasure-coded segments are stored in tangible memory media at the plurality of peer nodes.

11. The system of claim 10 wherein the first peer node includes a database for storing a generated distributed hash table (DHT) cross-referencing the (n+x) erasure-coded segments to the plurality of peer nodes storing the (n+x) erasure-coded segments.

12. The system of claim 10 wherein the first peer node coding module encrypts the data file prior to the first peer node transceiver transmitting the (n+x) erasure-coded segments to the plurality of peer nodes.

13. The system of claim 10 wherein the network-connected backup manager sends a node write-access key to the first peer node transceiver; and
wherein the first peer node coding module prepares the (n+x) erasure-coded segments for distribution with the node write-access key to gain storage access to a peer node associated with the write-access key in the peer group.

14. The system of claim 10 wherein the first peer node coding module prepares download requests for downloading the (n+x) erasure-coded segments from the peer group, in response to receiving instructions to recover the data file, and reassembles the data file from the downloaded (n+x) erasure-coded segments.

15. The system of claim 14 wherein the first peer node coding module prepares the download requests by reading a stored DHT and accessing a list of the (n+x) erasure-coded segments cross-referenced to the plurality of peer nodes storing the (n+x) erasure-coded segments.

16. The system of claim 14 wherein the first peer node transceiver receives a node read-access key from the network-connected backup manager; and
wherein the first peer node coding module prepares the download requests with the node read-access key to gain read access to a peer node associated with the read-access key in the peer group.

17. The system of claim 14 wherein the first peer node coding module reassembles an encrypted data file and decrypts the encrypted data file to recover the data file.

18. The system of claim 10 wherein the network-connected backup manager maintains a record of file storage activity of the first peer node.

19. A device for peer-to-peer distributed file storage, the device comprising:
a coding module having a first interface to receive a data file including a plurality of n segments for storage and a second interface to supply data file peer-storage information for the data file including a size of the data file and an identification of the device;
a transceiver having a third interface connected to the coding module, the transceiver transmitting the data file peer-storage information to a backup manager connected to the device over a network and receiving a mapping plan created by the backup manager based on the data file peer-storage information, the mapping plan maps (n+x) erasure-coded segments including the plurality of n segments and x extra erasure-coded segments across a plurality of peer nodes forming a peer group, wherein the mapping plan cross-references each segment of the (n+x) erasure-coded segments to a corresponding peer node from the plurality of peer nodes;
wherein the coding module segments the data file to create the (n+x) erasure-coded segments and uses the mapping plan for cross-referencing each segment of the (n+x) erasure-coded segments to the corresponding peer node; and wherein the transceiver transmits the (n+x) erasure-coded segments to the plurality of peer nodes in accordance with the mapping plan, wherein the (n+x) erasure-coded segments are stored in tangible memory media at the plurality of peer nodes.

\* \* \* \* \*